United States Patent
Soeno (10) Patent No.: US 7,251,101 B2
(45) Date of Patent: Jul. 31, 2007

(54) MAGNETIC HEAD FOR RECORDING/REPRODUCTION, MAGNETIC RECORDING MEDIUM, AND RECORDING/REPRODUCTION APPARATUS

(75) Inventor: Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 559 days.

(21) Appl. No.: 10/751,536

(22) Filed: Jan. 6, 2004

(65) Prior Publication Data

US 2004/0136113 A1 Jul. 15, 2004

(30) Foreign Application Priority Data

Jan. 7, 2003 (JP) ............................. 2003-000969

(51) Int. Cl.
*G11B 5/127* (2006.01)

(52) U.S. Cl. ..................................... 360/125
(58) Field of Classification Search ................ None
See application file for complete search history.

(56) References Cited

U.S. PATENT DOCUMENTS

| 4,847,715 | A | * | 7/1989 | Kumasaka et al. | ......... | 360/125 |
| 5,493,466 | A | * | 2/1996 | Suyama | ....................... | 360/126 |
| 5,590,009 | A | | 12/1996 | Ishide | | |
| 6,051,299 | A | | 4/2000 | Uchiyama et al. | | |

| 7,079,344 | B2 | * | 7/2006 | Nikitin | ....................... | 360/125 |
| 2003/0179481 | A1 | | 9/2003 | McNeil et al. | | |

FOREIGN PATENT DOCUMENTS

| JP | 58-118028 | 7/1983 |
| JP | 1-241001 | 9/1989 |
| JP | 6-111502 | 4/1994 |
| JP | 7-85406 | 3/1995 |
| JP | 7-085406 | 3/1995 |
| JP | 10-222944 | 8/1998 |
| JP | 11-328662 | 11/1999 |

OTHER PUBLICATIONS

English Language Abstact of JP58-118028.
English Language Abstact of JP 11-328662.
English Language Abstract of JP 7-85406.

* cited by examiner

*Primary Examiner*—Robert S. Tupper
(74) *Attorney, Agent, or Firm*—Greenblum & Bernstein, P.L.C.

(57) ABSTRACT

Both a magnetic recording width and a magnetic reproduction width of a magnetic head are equal to or larger than a combined width of a track width of tracks and double an off-track width of the magnetic head with respect to tracks on a magnetic recording medium during recording and reproduction of recording data, and are equal to or smaller than a width produced by subtracting double the off-track width during recording and reproduction from a combined width of the track width and double a groove width of grooves on the magnetic recording medium.

5 Claims, 2 Drawing Sheets

MAGNETIC HEAD FOR RECORDING/REPRODUCTION, MAGNETIC RECORDING MEDIUM, AND RECORDING/REPRODUCTION APPARATUS

BACKGROUND OF THE INVENTION

1. Field of the Invention

This invention relates to a magnetic head for recording/reproduction constructed so as to be capable of performing recording and reproduction of recording data for a discrete track-type magnetic recording medium on which a plurality of data recording tracks are formed, a magnetic recording medium for such magnetic head for recording/reproduction, and a recording/reproduction apparatus constructed so as to include the magnetic head for recording/reproduction and the magnetic recording medium.

2. Description of the Related Art

A discrete track-type recording medium (hereinafter also referred to as a "discrete track medium") on which a plurality of magnetically separated, concentric data recording tracks (hereinafter "tracks") are formed has been developed as a recording medium capable of high density recording. This discrete track medium can be mounted in an HDD (Hard Disk Drive) for example, and various types of recording data can be magnetically recorded via a magnetic head for recording/reproduction (hereinafter also referred to simply as a "magnetic head"). In this case, by forming non-magnetic parts, such as grooves, between respective tracks on a discrete track medium, an expansion of the effective recording track width due to stray fields of the magnetic head is avoided, and there are fewer instances of a recording of recording data onto adjacent tracks or a reproduction recording data recorded on adjacent tracks (i.e., "crosstalk"). Accordingly, since the formation pitch of respective tracks (hereinafter also referred to as "track pitch") can be narrowed, it is possible to record recording data at a high density.

As one example of a recording/reproduction apparatus that includes this type of discrete track medium and a magnetic head, a magnetic disk apparatus constructed so as to include a magnetic disk (1) and a magnetic head (H) is disclosed by Japanese Laid-Open Patent Publication No. H06-111502. In this type of recording/reproduction apparatus, during the recording and reproduction of recording data, when a servo pattern (Ps) formed on the magnetic disk is read, the servo mechanism moves the magnetic head (i.e., performs servo control) based on a servo detection signal outputted from the magnetic head so that the magnetic head traces a center (Tc) of a track. On the other hand, the same publication discloses that in order to avoid tracking errors, a magnetic effective reproduction head width of the magnetic head (a magnetic read width Wr), a track pitch (TP) of the magnetic disk, and a width of the servo pattern (Ts) should be designated so as to satisfy predetermined standards. More specifically, the sizes of the effective reproduction head width and the track pitch are designated as being approximately equal, and a width of the servo pattern is designated as being approximately equal to the track pitch or an integer multiple of the track pitch. By doing so, even if the magnetic head becomes displaced to a certain extent from a center of a track during servo control, there is no decrease in the output change of the tracking error signal so that tracking errors can be avoided.

However, as a result of analyzing conventional magnetic disk apparatuses, the present inventor discovered the following problem. That is, in conventional magnetic disk apparatuses, the respective sizes of parts of the magnetic disk and the magnetic head are designated with the main focus being on avoiding tracking errors. Here, if the respective sizes of the parts are designated when a recording/reproduction apparatus is designed, it is necessary to designate the respective sizes of the parts of the magnetic disk and the magnetic head not only to avoid tracking errors but also to avoid recording errors for recording data on a target track and reproduction errors for recording data read from a target track (hereinafter such errors are also referred to as "recording and reproduction errors"). In this type of magnetic disk apparatus (recording/reproduction apparatus), even if tracking servo control is performed for the magnetic head by a servo mechanism, the position of the magnetic head with respect to the recording track will fluctuate within a range of a predetermined displacement (a so-called "off-track width") due to factors such as a reading precision of the servo pattern by the magnetic head and errors in a movement control amount of the magnetic head set by the servo mechanism. On the other hand, the same publication discloses that the effective reproduction head width is set wider than the recording track width (Tw) and a magnetic effective recording head width (the effective write width Ww) is set wider than the recording track width. However, when the effective recording head width and the effective reproduction head width are set only slightly wider than the recording track width, there are cases where part of the recording track in the width direction is not included in the ranges of the effective recording head width and the effective reproduction head width of the magnetic head when the magnetic head is in a displaced state. In such a state, there are cases where it is difficult to sufficiently magnetize the recording track during the recording of recording data (i.e., it is difficult to properly record the recording data) and/or to properly read a magnetic signal recorded on a recording track when reproducing the recording data. In this way, with a conventional magnetic disk apparatus, there has been the problem that it has been difficult to reliably prevent recording and reproduction errors from occurring.

On the other hand, by setting the effective reproduction head width and the effective recording head width sufficiently wider than the recording track width, it is possible to include the entire width of the recording track in the ranges of the effective recording head width and the effective reproduction head width of the magnetic head even when the magnetic head has become displaced with respect to the recording track by a certain amount. Accordingly, when such a construction is used, it is possible to avoid recording and reproduction errors. However, to simultaneously avoid recording recording data on adjacent tracks and reproducing recording data recorded on adjacent tracks while avoiding recording and reproduction errors by setting the effective recording head width and the effective reproduction head width wider than the recording track width, it is necessary to widen the grooves located between respective tracks (i.e., to increase the track pitch) to a certain extent so as to prevent positions of the effective recording head width and the effective reproduction head width of the magnetic head from overlapping the adjacent tracks. This means that with a conventional magnetic disk apparatus, there is the problem that it is difficult to record recording data with a high density while avoiding recording and reproduction errors, recording on adjacent tracks, and reproduction from adjacent tracks.

SUMMARY OF THE INVENTION

The present invention was conceived in order to solve the above problems and it is a principal object of the present invention to provide a magnetic head for recording/reproduction, a magnetic recording medium, and a recording/reproduction apparatus that can reliably avoid recording and reproduction errors. It is a further object to provide a magnetic head for recording/reproduction, a magnetic recording medium, and a recording/reproduction apparatus that can achieve at least one of a high-density recording for recording data and a reduction in incidences of recording on adjacent tracks and reproduction from adjacent tracks.

To achieve the stated objects, a magnetic head for recording/reproduction according to the present invention is constructed so as to be capable of recording recording data onto and of reproducing recording data from a discrete track-type magnetic recording medium on which a plurality of concentric data recording tracks, which are magnetically separated by non-magnetic parts, are formed, wherein the magnetic head for recording/reproduction is constructed so that a magnetic effective recording head width of the magnetic head for recording/reproduction is equal to or larger than a combined width of a track width of the data recording tracks and double an off-track width of the magnetic head for recording/reproduction with respect to the data recording tracks during a recording of the recording data and is equal to or smaller than a width produced by subtracting double the off-track width during the recording from a combined width of the track width and double a width of the non-magnetic parts, and a magnetic effective reproduction head width of the magnetic head for recording/reproduction is equal to or larger than a combined width of the track width and double an off-track width of the magnetic head for recording/reproduction with respect to the data recording tracks during a reproduction of the recording data and is equal to or smaller than a width produced by subtracting double the off-track width during the reproduction from a combined width of the track width and double the width of the non-magnetic parts.

In this case, it is preferable for the magnetic head for recording/reproduction according to the present invention to be constructed so that the effective recording head width is wider than a track pitch of the data recording tracks and the effective reproduction head width is wider than the track pitch of the data recording tracks.

It is also preferable for the magnetic head for recording/reproduction according to the present invention to be constructed so that the effective recording head width and the effective reproduction head width are similar, and are both similar to a track pitch of the data recording tracks.

To achieve the stated objects, a magnetic recording medium according to the present invention is constructed as a discrete track-type medium on which a plurality of concentric data recording tracks, which are magnetically separated by non-magnetic parts, are formed and onto and from which recording data can be recorded and reproduced by a magnetic head for recording/reproduction, wherein the magnetic recording medium is constructed so that a track width of the data recording tracks is equal to or smaller than a width produced by subtracting double an off-track width of the magnetic head for recording/reproduction with respect to the data recording tracks during a recording of the recording data from a magnetic effective recording head width of the magnetic head for recording/reproduction, the track width is equal to or smaller than a width produced by subtracting double an off-track width of the magnetic head for recording/reproduction with respect to the data recording tracks during a reproduction of the recording data from a magnetic effective reproduction head width of the magnetic head for recording/reproduction, and a combined width of the track width and double a width of the non-magnetic parts is equal to or larger than a combined width of the effective recording head width and double the off-track width during the recording, and is equal to or larger than a combined width of the effective reproduction head width and double the off-track width during the reproduction.

In this case, it is preferable for the magnetic recording medium according to the present invention to be constructed so a track pitch of the data recording tracks is narrower than the effective recording head width of the magnetic head for recording/reproduction and is narrower than the effective reproduction head width of the magnetic head for recording/reproduction.

It is also preferable for the magnetic recording medium according to the present invention to be constructed so that the track pitch of the data recording tracks is similar to both the effective recording head width and the effective reproduction head width of the magnetic head for recording/reproduction.

A recording/reproduction apparatus according to the present invention comprises any of the magnetic head for recording/reproductions described above and any of the magnetic recording media described above and is constructed so as to be capable of recording the recording data onto the magnetic recording medium and of reproducing the recording data from the magnetic recording medium.

According to this magnetic head for recording/reproduction, magnetic recording medium, and recording/reproduction apparatus, the respective sizes of the parts are designated so that both the effective recording head width and the effective reproduction head width are equal to or larger than a combined width of the track width and double the off-track width and are equal to or smaller than a width produced by subtracting double the off-track width from the combined width of the track width and double the width of the non-magnetic parts, so that no matter how the magnetic head is displaced within the range of the off-track width with respect to a data recording track during the recording and reproduction of recording data, it can be ensured that the entire track width will be included in the ranges of the effective recording head width and the effective reproduction head width of the magnetic head, and it is also possible to avoid an overlapping of adjacent data recording tracks and positions of the effective recording head width and the effective reproduction head width of the magnetic head. By doing so, it is possible to reliably avoid recording and reproduction errors, recording onto adjacent tracks, and reproduction from adjacent tracks. In addition, recording data can be recorded at a high density compared to the case where in order to avoid the recording onto adjacent tracks and reproduction from adjacent tracks, both the effective recording head width and the effective reproduction head width are designated at a width that exceeds a width produced by subtracting double the off-track width from a combined width of the track width and double the width of the non-magnetic parts.

In addition, according to the present magnetic head for recording/reproduction, magnetic recording medium, and recording/reproduction apparatus, by designating the respective sizes of the parts so that a track pitch is narrower than both the effective recording head width and the effective reproduction head width, it is possible to increase the track density and to record the recording data at a high density. Also, no matter how the magnetic head is displaced within the range of the off-track width with respect to a data recording track during the recording and reproduction of recording data, it is possible to avoid recording and reproduction errors, recording onto adjacent recording tracks, and reproduction from adjacent recording tracks.

Also, according to the magnetic head for recording/reproduction, magnetic recording medium, and recording/reproduction apparatus according to the present invention, by designating the respective sizes of parts so that the effective recording head width and the effective reproduction head width are similar and are also similar to the track pitch, it is possible, while simultaneously avoiding recording and reproduction errors and the like, to achieve a high density recording of the recording data and to form the track width TW at a maximum, so that during the reproduction of recording data, magnetic signals recorded on the tracks can be efficiently read and a reproduction signal with a high level can be obtained.

It should be noted that the disclosure of the present invention relates to a content of Japanese Patent Application 2003-000969 that was filed on 7 Jan. 2003 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED
EMBODIMENTS

Hereafter, preferred embodiments of a magnetic head for recording/reproduction, a magnetic recording medium, and a recording/reproduction apparatus according to the present invention will be described with reference to the attached drawings.

First, the construction of a recording/reproduction apparatus 1 corresponding to the recording/reproduction apparatus according to the present invention will be described with reference to the drawings.

Figure 1:
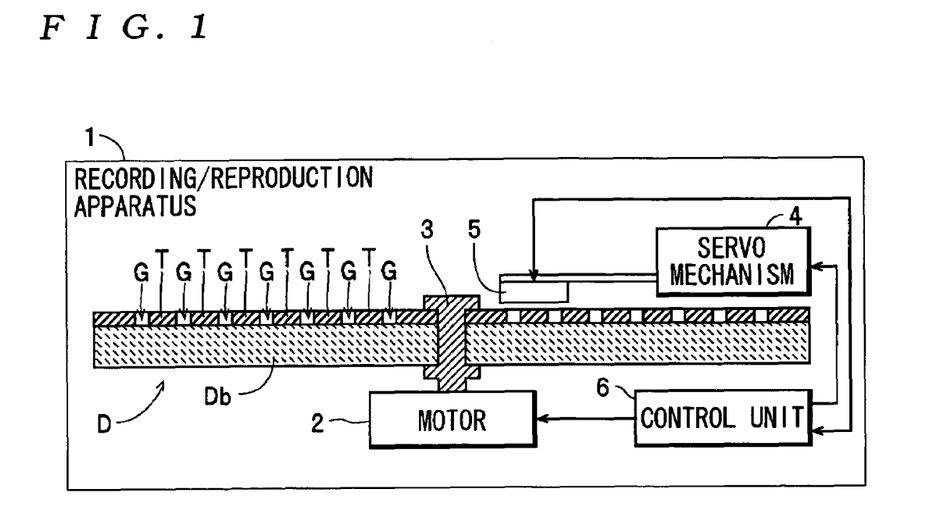
FIG. 1 is a diagram showing a construction of a recording/reproduction apparatus according to an embodiment of the invention.

As shown in FIG. 1, the recording/reproduction apparatus 1 is constructed so as to include a motor 2, a hub 3, a servo mechanism 4, a magnetic head 5, a control unit 6, and a discrete track medium D. The motor 2 rotates the hub 3 under the control of the control unit 6 so that the discrete track medium D attached to the hub 3 is rotated at a constant speed, for example, a constant angular velocity. Under the control of the control unit 6, the servo mechanism 4 moves the magnetic head 5 over the discrete track medium D that is being rotated by the motor 2 and in this state moves the magnetic head 5 towards an inner periphery or an outer periphery of the discrete track medium D (this is called "tracking servo control"). The specific method used for tracking servo control is well known, and therefore description of such has been omitted. The magnetic head 5 corresponds to the magnetic head for recording/reproduction according to the present invention, is constructed so as to be capable of magnetically recording (i.e., magnetizing a data recording track) and reproducing (i.e., reading a magnetic signal recorded on a data recording track) recording data onto or from the discrete track medium D, and outputs a predetermined output signal (a "read signal") when reproducing recording data. As described later, the magnetic head 5 is constructed so that a magnetic effective recording head width (hereinafter also referred to as "recording width") MWW and a magnetic effective reproduction head width (hereinafter also referred to as "reproduction width") MRW thereof are similar (i.e., are equal or approximately equal). The control unit 6 carries out rotation control over the motor 2 and recording and reproduction control of recording data with respect to the discrete track medium D via the magnetic head 5. The control unit 6 also keeps the magnetic head 5 in an "on-track" state with respect to a track T on the discrete track medium D by having the servo mechanism 4 move the magnetic head 5 towards the inner periphery or the outer periphery of the discrete track medium D in accordance with an output state of the servo detection signal outputted by the magnetic head 5 during the reproduction of recording data.

The discrete track medium D corresponds to the discrete track-type magnetic recording medium according to the present invention, and is constructed with a plurality of concentric tracks T, T, . . . being formed of a magnetic material on the surface of a substrate Db made from glass, aluminum, or the like in the form of a disc and grooves G, which correspond to "non-magnetic parts" of the present invention, being formed between adjacent tracks T, T. In this case, the multiple tracks T, T, . . . are actually formed with a narrow pitch across almost an entire surface of a recording/reproduction area of the discrete track medium D. A servo pattern for tracking servo control purposes is also formed on the discrete track medium D, but like the tracking servo control method, this has been omitted from the drawings and description of the present embodiment. In addition, the recording/reproduction apparatus 1 actually includes components such as an amplifier for amplifying and outputting the output signal outputted by the magnetic head 5, an A/D converter for digitally converting the output signal of the amplifier, a data input/output interface for sending and receiving recording data and the like to and from an external apparatus (such as a personal computer), and a power supply connector, but for ease of understanding the present invention, such components have been omitted from the drawings and the description.

In this case, when tracking servo control is performed over the magnetic head 5 by the servo mechanism 4 and the control unit 6 in the recording/reproduction apparatus 1, the centers of the recording width MWW and the reproduction width MRW of the magnetic head 5 in the width direction can become slightly displaced with respect to the center of a track T in the width direction within a predetermined range. As described above, such displacement is caused by factors such as a reading precision of the servo pattern by the magnetic head 5 and errors in the movement control amount of the magnetic head 5 by the servo mechanism 4 and the control unit 6, and in the recording/reproduction apparatus 1, an off-track width OTW (see FIG. 2) as the displaced amount (the "predetermined range" mentioned above) of the magnetic head 5 during recording and during reproduction is around 40 nm as a maximum. In the recording/reproduction apparatus 1, a track pitch TP of the respective tracks T, T, . . . on the discrete track medium D is designated at 300 nm, a track width TW of the tracks T is designated at 200 nm, and a groove width GW of a groove G is designated at 100 nm. In this case, the track pitch TP of the tracks T, T, . . . is designated as being similar to (i.e., equal or approximately equal to) both the recording width MWW and the reproduction width MRW of the magnetic head 5. In addition, the track width TW (200 nm) is designated as being equal to or narrower than a width (220 nm) produced by subtracting double the off-track width OTW (40*2=80 nm) from the recording width MWW or the reproduction width MRW (300 nm) of the magnetic head 5. A combined width (400 nm) of the track width TW (200 nm) and double the groove width GW (100*2=200 nm) is also designated as being equal to or larger than a combined width (380 nm) of the recording width MWW or the reproduction width MRW (300 nm) of the magnetic head 5 and double the off-track width OTW (40*2=80 nm).

On the other hand, as described above, the magnetic head 5 is designated so that at 300 nm, both the recording width MWW and the reproduction width MRW are similar to the track pitch TP of the tracks T. In this case, the recording width MWW and the reproduction width MRW (300 nm) are designated as being equal to or larger than the combined width (280 nm) of the track width TW (200 nm) and double the off-track width OTW (40*2=80 nm) and also equal to or smaller than a width (320 nm) produced by subtracting double the off-track width OTW (80 nm) from a combined width (400 nm) of double the groove width (200 nm) and the track width TW (200 nm).

Next, the relationship between the respective sizes (widths) of the parts of the recording/reproduction apparatus 1 and positions of the magnetic head 5 and the tracks T during the recording and reproduction of recording data will be described with reference to the drawings.

In the recording/reproduction apparatus 1, during the recording and reproduction of recording data on and from the discrete track medium D, the magnetic head 5 is set in an on-track state with respect to one of the tracks T on the discrete track medium D by servo control carried out by the servo mechanism 4 and the control unit 6. At this time, since the sizes of the parts are designated so that both the recording width MWW and the reproduction width MRW of the magnetic head 5 are wider than the track width TW of the tracks T, as shown by the solid line in FIG. 2, in a state where the magnetic head 5 is set in an on-track state with respect the track T so that the center of the magnetic head 5 in the width direction approximately matches the center of the track T in the width direction, an entire width of the track T located below the magnetic head 5 (i.e., the position diagonally shaded from top right to bottom left) is included in the ranges of the recording width MWW and the reproduction width MRW of the magnetic head 5 (i.e. the entire width of the track T is overlapped by the position of the recording width MWW and the reproduction width MRW of the magnetic head 5). Accordingly, during the recording of recording data, the entire width of the track T is sufficiently magnetized by a magnetic signal outputted from the magnetic head 5, and during the reproduction of recording data, a magnetic signal recorded on the track T can be efficiently read by the magnetic head 5, so that an output signal with a high level is obtained. As a result, recording data can be reliably recorded and reproduced. Also, since the respective sizes of the parts are designated so that both the recording width MWW and the reproduction width MRW are narrower than the combined width of the track width TW and double the groove width GW, the overlapping of positions of the recording width MWW and the reproduction width MRW of the magnetic head 5 and adjacent tracks T, T is avoided. Accordingly, recording onto adjacent tracks and reproduction from adjacent tracks is prevented during the recording and reproduction of recording data.

Figure 2:
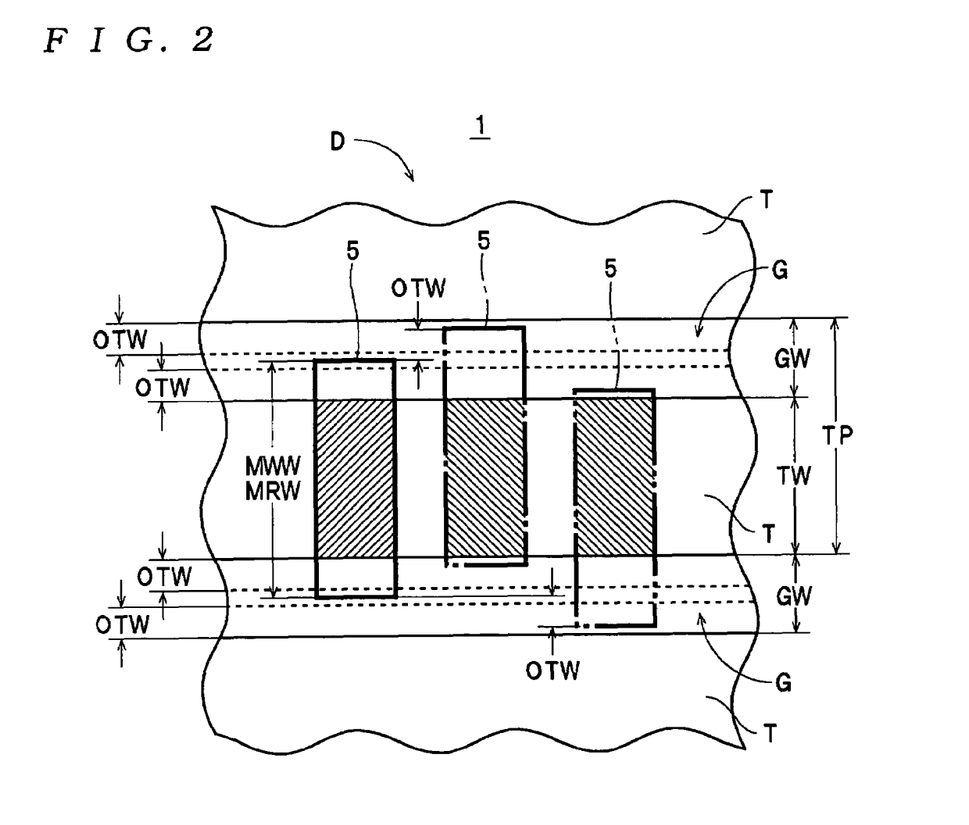
FIG. 2 is a plan view useful in explaining a relationship between a track width of tracks, a groove width of grooves, and a track pitch of the tracks on a discrete track medium of the recording/reproduction apparatus, a recording width and a reproduction width of a magnetic head, and an off-track width of the magnetic head with respect to the tracks.

In addition, in the recording/reproduction apparatus 1, even if the magnetic head 5 is displaced with respect to a track T within the range of the off-track width OTW, as shown by the dot-dash line and the dot-dot-dash line in FIG. 2, the recording data is reliably recorded and reproduced, with recording onto the adjacent tracks and reproduction from the adjacent tracks being prevented. More specifically, since the respective sizes of the parts are designated so that both the recording width MWW and the reproduction width MRW of the magnetic head 5 are equal to or wider than the combined width of the track width TW of a track T and double the off-track width OTW, even if the magnetic head 5 is displaced with respect to the track T in either direction within the off-track width OTW (i.e. the magnetic head 5 is in one of the states shown by the dot-dash line and the dot-dot-dash line), the entire width (i.e., the position diagonally shaded from top left to bottom right) of the track T located below the magnetic head 5 is included in the recording width MWW and the reproduction width MRW of the magnetic head 5. Accordingly, during the recording of recording data, the entire width of the track T is sufficiently magnetized and during the reproduction of recording data, an output signal with a high level is obtained. Also, since the respective sizes of the parts are designated so that both the recording width MWW and the reproduction width MRW are narrower than a width produced by subtracting double the off-track width OTW from the combined width of the track width TW and double the groove width GW, even if the magnetic head 5 is displaced with respect to the track T in either direction within the off-track width OTW, an overlapping of the adjacent tracks T, T and the positions of the recording width MWW and the reproduction width MRW of the magnetic head 5 is avoided, and a gap (in this example, 10 nm) is produced between the adjacent tracks T, T and the positions of the recording width MWW and the reproduction width MRW. Accordingly, even when the magnetic head 5 has become displaced, for example, the recording and reproduction of recording data can be executed for only the track T located below the magnetic head 5.

Also, in the recording/reproduction apparatus 1, since the sizes of the parts are designated so that both the recording width MWW and the reproduction width MRW are narrower than a width produced by subtracting double the off-track width OTW from the combined width of the track width TW and double the groove width GW, the gaps produced between an adjacent track T and respectively the recording width MWW and the reproduction width MRW when the magnetic head 5 is displaced are extremely narrow at 10 nm. Accordingly, compared to a recording/reproduction apparatus in which the respective sizes of the parts are designated so that both the recording width MWW and the reproduction width MRW are wider than a width produced by subtracting double the off-track width OTW from the combined width of the track width TW and double the groove width GW, it is possible to make the adjacent tracks T, T, . . . closer, so that as a result the track density can be increased, and the recording data can be recorded at high density while the recording onto adjacent tracks and reproduction from adjacent tracks is avoided.

Figure 3:
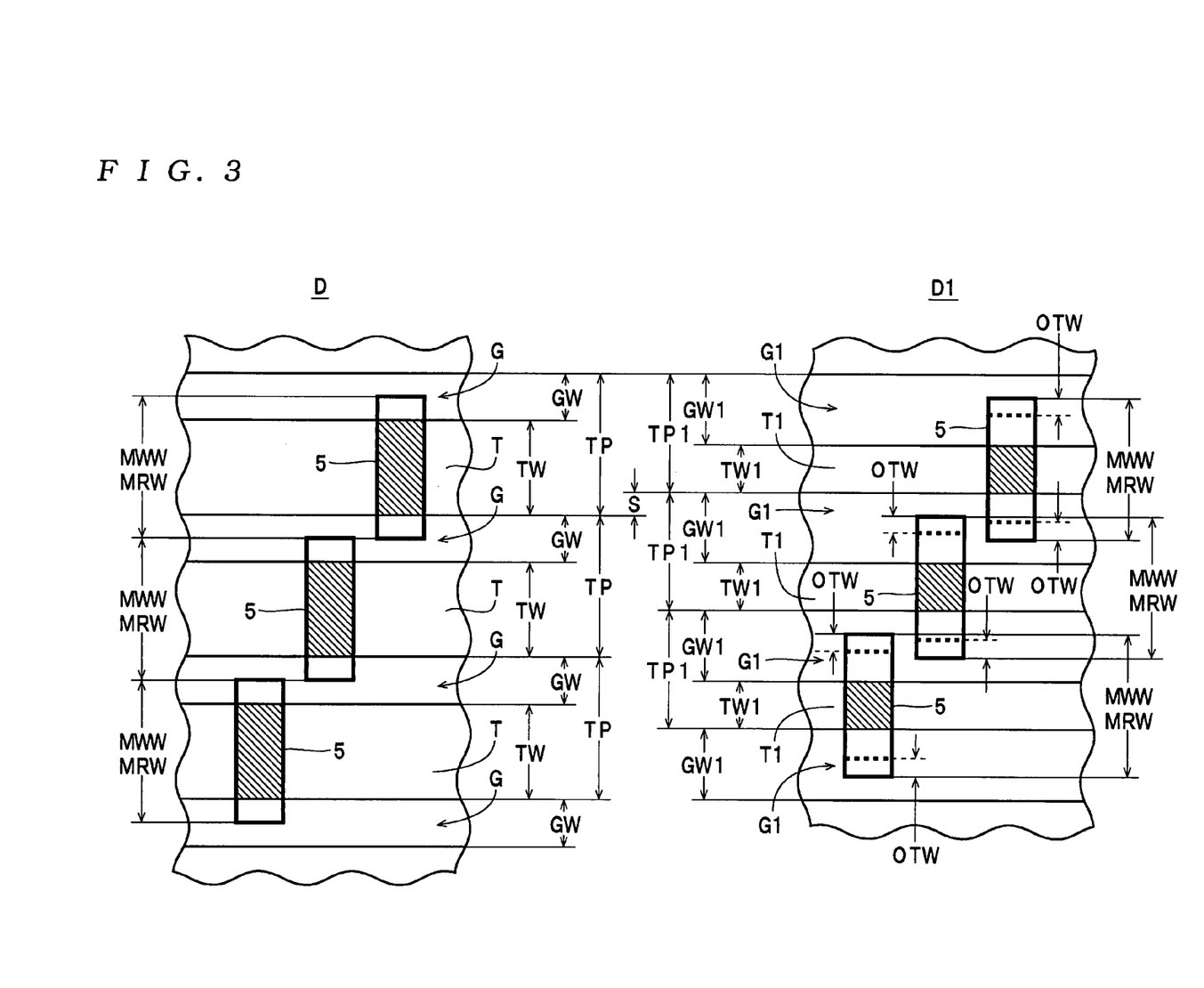
FIG. 3 is a plan view useful in explaining a relationship between the recording width and the reproduction width of the magnetic head and a track pitch on a discrete track medium according to another embodiment of the present invention and the track pitch of the discrete track medium.

On the other hand, a discrete track medium D1 shown on the right side of FIG. 3 is formed so that a track width TW1 of tracks 1 thereon is narrower than the track width TW of the discrete track medium D shown on the left side of the same drawing. More specifically, like the track width TW of the tracks T on the discrete track medium D, the track width TW1 of the tracks T1 on the discrete track medium D1 is designated as being equal to or narrower than widths produced by subtracting double the off-track width OTW from the recording width MWW and the reproduction width MRW of the magnetic head 5, respectively, and is designated as being double a width S narrower than the track width TW of the tracks T on the discrete track medium D as shown in FIG. 3. Accordingly, the discrete track medium D1 is similar to the discrete track medium D in that recording data is reliably recorded and reproduced even when the magnetic head 5 is displaced with respect to the track T1 within the range of the off-track width OTW.

On the discrete track medium D1, to avoid the recording of recording data onto adjacent tracks and the reproduction of recording data from adjacent tracks, in the same way as the discrete recording medium D, the sizes of the respective parts are designated so that a combined width of the track width TW1 and double the groove width GW1 of the grooves G1 is equal to or wider than a combined width of the recording width MWW of the magnetic head 5 and double the off-track width OTW and also equal to or wider than a combined width of the reproduction width MRW of the magnetic head 5 and double the off-track width OTW. More specifically, the groove width GW1 of the grooves G1 is designated as being the aforementioned width S wider than the groove width GW of the grooves G on the discrete track medium D so that the length from the center of a track T1 on the discrete track medium D1 to an outer edge of a groove G1 is equal to the length from the center of a track T on the discrete track medium D to an outer edge of a groove G. Accordingly, on the discrete track medium D1, the track pitch TP1 is narrower than both the recording width MWW and the reproduction width MRW of the magnetic head 5 and is the width S narrower than the track pitch TP of the discrete track medium D, so that the track density is raised by a corresponding amount. As a result, with the discrete track medium D1, recording data can be recorded at a high density, and no matter how the magnetic head 5 is displaced within the off-track width OTW with respect to a track T during the recording and reproduction of recording data, recording and reproduction errors, recording on adjacent tracks, and reproduction from adjacent tracks can be reliably avoided.

In this way, according to the recording/reproduction apparatus 1, by designating the respective sizes of the parts so that both the recording width MWW and the reproduction width MRW are wider than a combined width of the track width TW and double the off-track width OTW and are also are equal to or smaller than a width produced by subtracting double the off-track width OTW from the combined width of the track width TW and double the groove width GW, no matter how the magnetic head 5 is displaced within the range of the off-track width OTW with respect to the track T during the recording or reproduction of recording data, it can be ensured that the entire track width TW will be included within the ranges of the recording width MWW and the reproduction width MRW of the magnetic head 5, and the overlapping of adjacent tracks T and the positions of the recording width MWW and the reproduction width MRW of the magnetic head 5 can also be avoided. By doing so, it is possible to reliably avoid recording and reproduction errors, recording onto adjacent tracks and reproduction from adjacent tracks. In addition, compared to the case where in order to avoid the recording onto adjacent tracks and reproduction from adjacent tracks both the recording width MWW and the reproduction width MRW are designated at a width that exceeds a width produced by subtracting double the off-track width OTW from a combined width of the track width TW and double the groove width GW, recording data can be recorded at a high density.

Also, according to the recording/reproduction apparatus 1, by designating the respective sizes of the parts so that the track pitch TP1 is narrower than both the recording width MWW and the reproduction width MRW of the magnetic head 5, it is possible to raise the track density, so that the recording data can be recorded at a high density. Also, no matter how the magnetic head 5 is displaced within a range of the off-track width OTW with respect to the track T1 during the recording or reproduction of recording data, recording and reproduction errors, recording onto adjacent tracks and reproduction from adjacent tracks can be avoided.

Also, according to the recording/reproduction apparatus 1, by designating the respective sizes of the parts so that the recording width MWW and the reproduction width MRW are similar and are similar to the track pitch TP, while simultaneously avoiding recording and reproduction errors and the like, it is possible to achieve a high density recording of the recording data and to form the track width TW at a maximum, so that during the reproduction of recording data, magnetic signals recorded on the tracks T can be efficiently read and a reproduction signal with a high level can be obtained.

It should be noted that the present invention is not limited to the embodiments described above and various modifications can be made as appropriate. For example, in the embodiments of the present invention, an example where the track pitch TP of the discrete track medium D is set at 300 nm, the track width TW is set at 200 nm, the groove width GW is set at 100 nm, and both the recording width MWW and the reproduction width MRW of the magnetic head 5 are set at 300 nm is described, but such numerical values are merely for illustrative purposes and the sizes may be freely changed within ranges that satisfy the conditions of the present invention. Also, the sizes may be designated in accordance with either a method of designating the recording width MWW and the reproduction width MRW of the magnetic head 5 in accordance with the respective sizes of the parts of the discrete track medium D or a method of designating the respective sizes of parts of the discrete track medium D in accordance with the recording width MWW and the reproduction width MRW of the magnetic head 5. Additionally, the discrete track-type recording medium of the present invention includes both a single-sided recording medium and a double-sided type where a plurality of concentric data recording tracks are formed on both front and rear surfaces of a substrate. The discrete track-type recording medium of the present invention also includes media where the grooves F are filled with a non-magnetic material.

What is claimed is:

1. A magnetic head for recording/reproduction constructed so as to be capable of recording recording data onto and of reproducing recording data from a discrete track-type magnetic recording medium on which a plurality of concentric data recording tracks, which are magnetically separated by non-magnetic parts, are formed, wherein the magnetic head for recording/reproduction is constructed so that a magnetic effective recording head width of the magnetic head for recording/reproduction is equal to or larger than a combined width of a track width of the data recording tracks and double an off-track width of the magnetic head for recording/reproduction with respect to the data recording tracks during a recording of the recording data and is equal to or smaller than a width produced by subtracting double the off-track width during the recording from a combined width of the track width and double a width of the non-magnetic parts, and a magnetic effective reproduction head width of the magnetic head for recording/reproduction is equal to or larger than a combined width of the track width and double an off-track width of the magnetic head for recording/reproduction with respect to the data recording tracks during a reproduction of the recording data and is equal to or smaller than a width produced by subtracting double the off-track width during the reproduction from a combined width of the track width and double the width of the non-magnetic parts.

2. A magnetic head for recording/reproduction according to claim 1,
wherein the effective recording head width is wider than a track pitch of the data recording tracks and the effective reproduction head width is wider than the track pitch of the data recording tracks.

3. A magnetic head for recording/reproduction according to claim 1, wherein the magnetic head for recording/reproduction is constructed so that the effective recording head width and the effective reproduction head width are similar, and are both similar to a track pitch of the data recording tracks.

4. A recording/reproduction apparatus comprising a magnetic head for recording/reproduction according to claim 1 and a magnetic recording medium and constructed so as to be capable of recording the recording data onto the magnetic recording medium and of reproducing the recording data from the magnetic recording medium.

5. A recording/reproduction apparatus according to claim 4, wherein said magnetic recording medium is a discrete track-type medium on which a plurality of concentric data recording tracks, which are magnetically separated by non-magnetic parts, are formed and onto and from which recording data can be recorded and reproduced by a magnetic head for recording/reproduction,
wherein the magnetic recording medium is configured such that a track width of the data recording tracks is equal to or smaller than a width produced by subtracting double an off-track width of the magnetic head for recording/reproduction with respect to the data recording tracks during a recording of the recording data from a magnetic effective recording head width of the magnetic head for recording/reproduction, the track width is equal to or smaller than a width produced by subtracting double an off-track width of the magnetic head for recording/reproduction with respect to the data recording tracks during a reproduction of the recording data from a magnetic effective reproduction head width of the magnetic head for recording/reproduction, and a combined width of the track width and double a width of the non-magnetic parts is equal to or larger than a combined width of the effective recording head width and double the off-track width during the recording, and is equal to or larger than a combined width of the effective reproduction head width and double the off-track width during the reproduction.

* * * * *

UNITED STATES PATENT AND TRADEMARK OFFICE
CERTIFICATE OF CORRECTION

PATENT NO. : 7,251,101 B2 Page 1 of 1
APPLICATION NO. : 10/751536
DATED : July 31, 2007
INVENTOR(S) : Yoshikazu Soeno It is certified that error appears in the above-identified patent and that said Letters Patent is hereby corrected as shown below:

At column 11, line 34 (claim 4, line 3), after "medium", delete "and".

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,251,101 B2
APPLICATION NO. : 10/751536
DATED : July 31, 2007
INVENTOR(S) : Yoshikazu Soeno

It is certified that error appears in the above-identified patent and that said Letters Patent is hereby corrected as shown below:

At column 11, line 34 (claim 4, line 3) should read -- and a magnetic recording medium and constructed so as to --.

This certificate supersedes the Certificate of Correction issued June 17, 2008.

Signed and Sealed this

Twelfth Day of January, 2010

David J. Kappos
*Director of the United States Patent and Trademark Office*